United States Patent [19]

Zievers et al.

[11] Patent Number: 5,223,138
[45] Date of Patent: Jun. 29, 1993

[54] REINFORCED CERAMIC FILTER CANDLE AND METHOD OF MAKING SAME

[76] Inventors: James F. Zievers; Elizabeth C. Zievers, both of 1240 Carriage La., LaGrange, Ill. 60525

[21] Appl. No.: 650,019

[22] Filed: Feb. 4, 1991

[51] Int. Cl.$^5$ .................. B01D 39/20; C04B 41/50
[52] U.S. Cl. .................. 210/497.01; 210/510.1; 55/523; 55/DIG. 5; 264/62; 264/63
[58] Field of Search ........... 425/311, 405.1, 817 R, 425/DIG. 37; 210/510.1, 497.01; 264/62, 63; 55/523, DIG. 5, 524

[56] References Cited

U.S. PATENT DOCUMENTS

| | | | |
|---|---|---|---|
| 4,692,248 | 9/1987 | Stannard et al. | 210/510.1 |
| 4,753,728 | 6/1988 | VanderBilt et al. | 210/510.1 |
| 4,874,516 | 10/1989 | Konda | 210/510.1 |
| 4,894,070 | 1/1990 | Keidel et al. | 210/510.1 |

Primary Examiner—Robert A. Dawson
Assistant Examiner—W. L. Millard
Attorney, Agent, or Firm—Edmond T. Patnaude

[57] ABSTRACT

A ceramic filter candle is formed by a skeleton of ceramic fibers and spaced apart metallic perforate reinforcing members bonded together by means of a ceramic binder and a porous ceramic coating material which partially fills the interstices between the fibers and the perforations in the reinforcing members. The candle is manufactured in a vacuum forming process wherein an aqueous slurry of the ceramic fibers and a ceramic binder is drawn through a generally cylindrical mold surface and the preformed tubular reinforcing members to deposit the fibers on the mold surface and over the reinforcing members. The fibers and the reinforcing members are subsequently coated with a ceramic material.

5 Claims, 2 Drawing Sheets

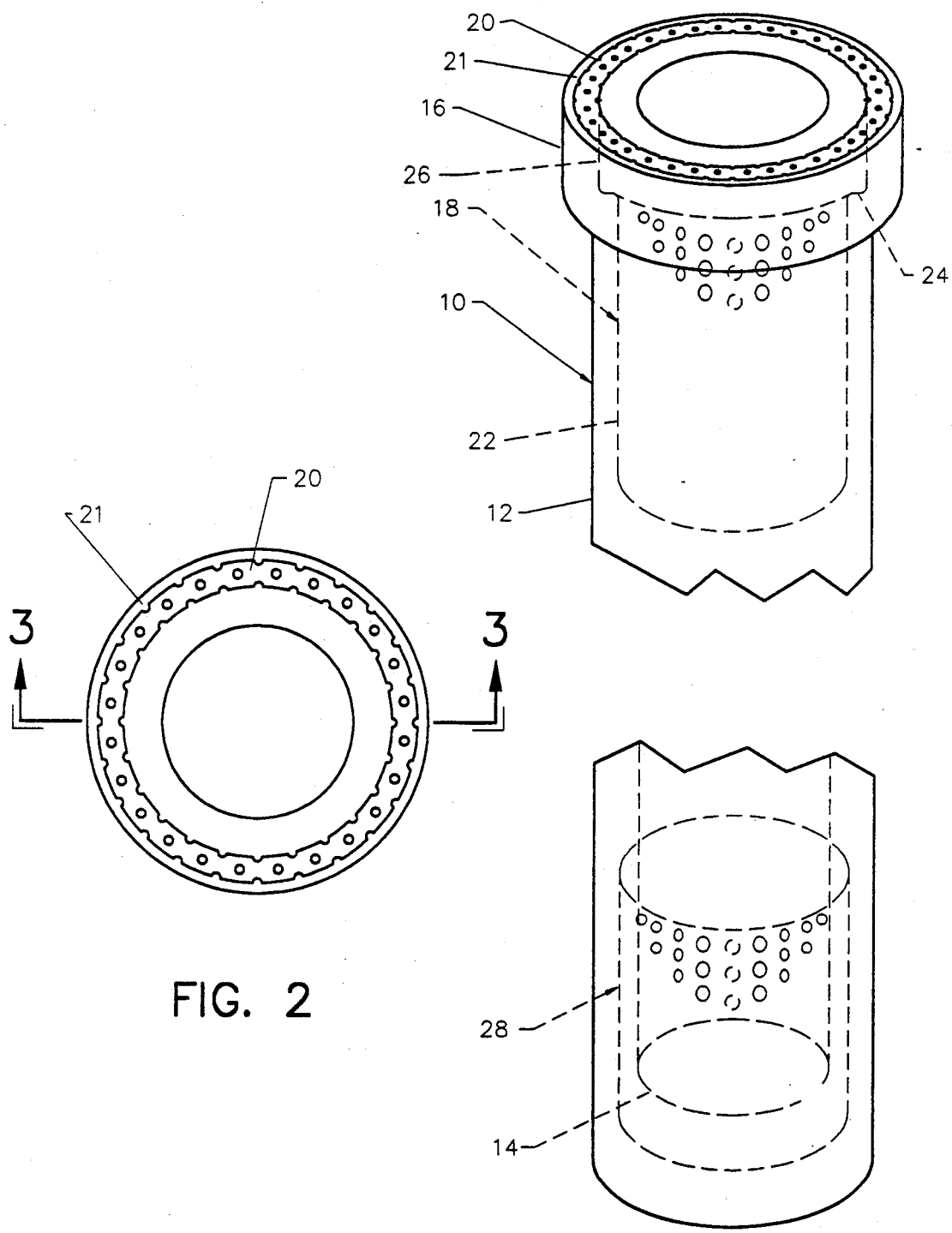

REINFORCED CERAMIC FILTER CANDLE AND METHOD OF MAKING SAME

The present invention relates in general to ceramic filter elements of the type known in the art as candle filters, and it relates more particularly to a new and improved ceramic candle filter which is reinforced at the top and bottom ends thereof and to a method of making a reinforced ceramic filter element.

BACKGROUND OF THE INVENTION

In U.S. Pat. No. 4,968,467 there is described a lightweight ceramic filter element for filtering entrained particulate matter from hot gasses in which the particulates are entrained. The filter element includes a ceramic skeletal form which is filled with ceramic particles in a vacuum process to provide a filter element having the requisite porosity. The filled skeletal form is then coated with Alpha Alumina gel to further reduce the mean size of the pores in the element, and the coated member is then heated to dry the coating. The resulting filter element is relatively light as compared to the prior art ceramic filters and has a high degree of resistance to corrosion by the hot gasses to be filtered. However, while not as brittle as the ceramic filters of the prior art type, this fibrous type of filter element is relatively brittle and does not have as great a shear strength as does the prior art type of ceramic filter element. Consequently, where relatively high differential pressures across the filter are expected to be encountered, or where the filter elements may be subjected to rough handling during shipment and installation, fracture of the filter elements can present a problem.

SUMMARY OF THE INVENTION

Briefly, there is provided in accordance with one aspect of the present invention a new and improved filter candle which incorporates spaced apart perforate reinforcing members at the major stress points in the candle to inhibit fracture of the candle. The reinforcing members are preferably perforate metal stampings which are an integral part of the filter candle and are encapsulated within a protective ceramic coating during manufacture of the filter candle so as not to be contacted by the hot and corrosive gasses passing through the filter element during use thereof. Being spaced apart, the expansion and contraction of the reinforcing members resulting from extreme temperature changes during use of the filter candle does not cause the filter to fracture.

In the manufacture of the filter element, the ceramic skeletal member and the reinforcing members are preferably contacted during the same coating operation with alumina gel, colloidal alluminum or colloidal silica which coats any exposed surfaces of the skeletal member and the reinforcing members prior to a final heat treating step wherein the coatings are dried.

In another embodiment of the invention, a portion of the reinforcing member is disposed at the upper surface of the filter element to enable use of a clamp or other surface abutting member to secure the filter element to a tube sheet or the like. Preferably, the exposed surface of the reinforcing member is coated with alumina gel, colloidal alumina or colloidal silica or other high temperature coating material at the same time the outer surface of the porous filter candle is coated to strengthen the filter candle and to increase the resistance thereof to corrosive attack by hot gasses during use.

GENERAL DESCRIPTION OF THE DRAWING

A better understanding of the present invention may be had from a reading of the following detailed description taken in connection with the accompanying drawing wherein:

FIG. 1 is a fragmentary isometric view of a filter candle embodying the present invention;

FIG. 2 is a top view of the filter candle shown in FIG. 1;

DETAILED DESCRIPTION OF A PREFERRED EMBODIMENT

Figure 3:
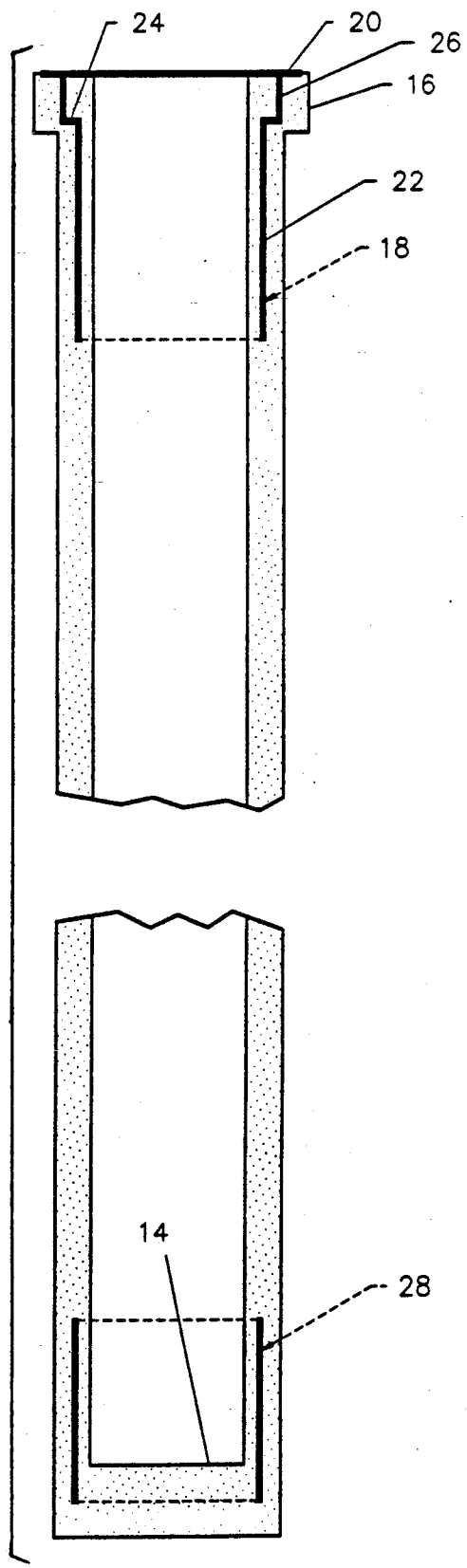
FIG. 3 is a fragmentary elevational view of the filter candle shown in FIG. 1.

Referring to the FIGS. 1, 2, and 3, there is shown a filter element 10 of the type generally known as a candle filter. The element 10 has a tubular cylindrical central body section 12 having a bottom end, which is closed by an integral wall 14, and an open upper end. An integral external flange 16 surrounds the upper portion of the filter element 10 and is used in mounting the filter element to an associated support structure such, for example, as an apertured tube sheet. The body section, the bottom end wall 14 and the flange 16 are essentially the same as described in U.S. Pat. No. 4,968,467. Accordingly, they comprise a skeletal ceramic form which is filled with a porous particulate ceramic material.

A first perforate metal stamping member 18 is partially embedded in the upper portion of the filter element and may be seen to include an external flange 20 which overlies the top face 21 of the filter element and a depending cylindrical tubular section 22 which extends downwardly through the filter element to a short distance below the flange 16. An offset 24 is provided in the member 18 a short distance above the bottom of the flange 16, and a second cylindrical section 26 is provided between the offset 24 and the flange 20 at the top. As a consequence of the offset portion 24, the sections 22 and 26 are centered within the side wall of the filter element.

At the bottom of the filter element 10 there is provided another perforate metal stamping member 28 which is a tubular cylindrical member embedded in the filter element and extending from a location a short distance above the top of the bottom wall 14 and to a location a short distance below the of the bottom wall 14. It is important that the reinforcing members do not extend a great distance into the body section of the filter element so that expansion and contraction of the reinforcing members during use of the filter candle does not apply an appreciable stress to the ceramic portions of the filter element.

The major stress points in the filter 10 are at the juncture between the flange 16 and the body 12 and at the juncture between the bottom wall 14 and the body 12. Therefore, the reinforcing members 18 and 28 are positioned in these areas of the filter element across the stress areas.

Figure 4:
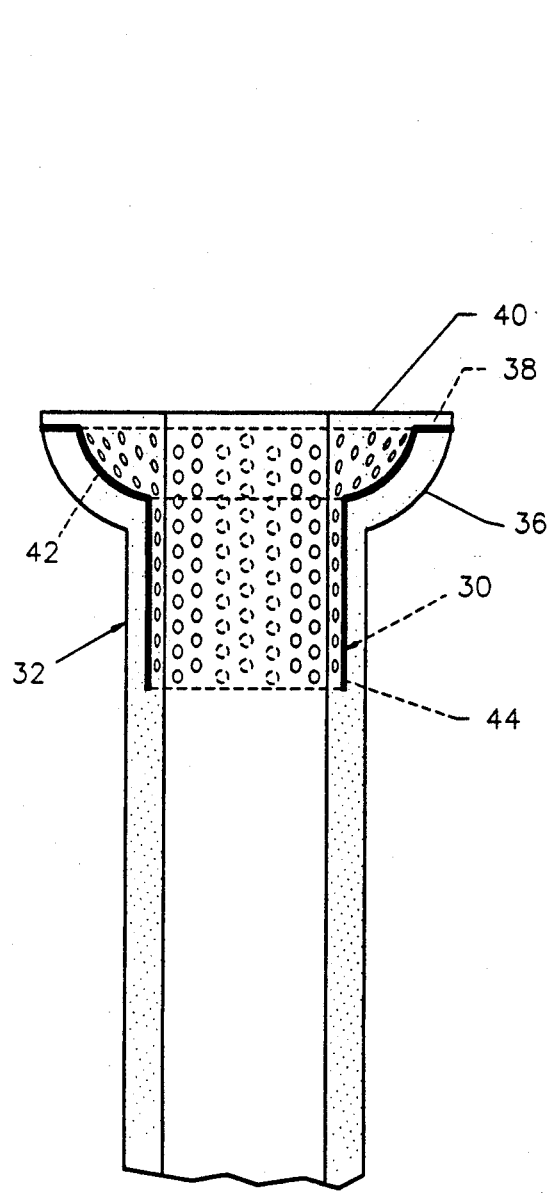
FIG. 4 is a fragmentary elevational view of an alternative embodiment of the present invention.

Referring to FIG. 4, there is shown another embodiment of the present invention wherein a perforate reinforcing member 30 is entirely embedded within a porous ceramic filter candle 32. The candle 32 has a cylindrical body section 34 and an external annular flange 36 at the top. The flange 36 is of the type known in the art as a "hemi flange" because of the hemispherical shape of the outer surface of the flange. It may seen that the reinforcing member 30 has an external annular flange portion 38 at the top which is spaced downwardly from the top face 40 of the filter element so as to be embedded within the ceramic material forming the filter element. The reinforcing member 30 may be seen to further include a hemispherical section 42 and a cylindrical section 44 which depends from the section 42. It may thus be seen that the entire reinforcing member 30 is enclosed within the ceramic material making up the filter element 32.

METHOD OF MANUFACTURE

In order to manufacture the filter 10, a ceramic skeleton is formed of short ceramic fibers in a vacuum forming process wherein an aqueous slurry of short ceramic fibers and a suitable high temperature liquid binder, such as alpha alumina or silica, is drawn through a porous mold to deposit the fibers in a random pattern over the surface of the mold and onto the surfaces of the upper and lower reinforcing members 18 and 20. The reinforcing members 18 and 28 are initially mounted in the mold so that the ceramic fibers which form the skeleton also enclose the reinforcings member and are subsequently bonded to them when the skeletal form including the reinforcing members is subsequently dried to bind the ceramic fibers and the reinforcing members together into a rigid unitary mass.

The skeletal form and the reinforcing members are then encapsulated within a porous ceramic material such as alumina gel, alpha alumina or colloidal silica which coats the exposed surfaces of the skeletal form and of the reinforcing member and partially fills the interstices in the skeletal form and in the reinforcing member with the ceramic coating material.

Since the reinforcing members are formed of metal, it is important that the reinforcing members be encapsulated within a ceramic coating in order to prevent the hot and corrosive gasses which pass through the filter element from contacting and thus corroding the metallic reinforcing members.

The porous mold may be either male or female. Where a male mold or mandrel is used, the outer surface of the filter element will have a somewhat rough or bark-like texture. Where the mold is female, the outer surface of the filter element will complement the surface of the mold and can thus be made smooth or of most any other desired texture.

While the present invention has been described in connection with particular embodiments thereof, it will be understood that those skilled in the art may make many changes and modifications without departing from the true spirit and scope of the invention. Therefore, by the appended claims it is intended to cover all such changes and modifications which come within the true spirit and scope of the invention.

We claim:

1. A method of making a filter element, comprising the steps of
   positioning a perforate reinforcing member in proximity to a perforate mold surface,
   forming over said reinforcing member and said mold surface a skeletal member of refractory ceramic fibers bonded together and to said reinforcing member by drawing an aqueous slurry of a ceramic binder and said fibers onto said mold surface, and heat treating the formed part to dry the binder,
   then coating said skeletal member and said reinforcing member with a ceramic coating material in liquid form, and
   then heat treating said skeletal member and said reinforcing member to dry said ceramic coating material.

2. The method set forth in claim 1 wherein said liquid ceramic coating material is selected from the group consisting of alumina gel, alpha aluminum, colloidal aluminum and colloidal silica.

3. A ceramic filter element comprising in combination
   a tubular ceramic skeletal member formed of randomly disposed ceramic fibers bonded together to form a porous, unitary mass, and
   first and second tubular, perforate reinforcing members disposed in mutually spaced apart longitudinal relationship with and concentrically disposed said tubular skeletal member,
   the fibers of said skeletal member and said reinforcing members being bonded together by a ceramic binder, and
   said skeletal ember and said reinforcing member being encased in a ceramic material.

4. The ceramic filter element according to claim 3, wherein said ceramic material is selected from the group consisting of alpha aluminum, alumina gel, and silica.

5. The ceramic filter element according to claim 4, wherein
   said filter element is in the form of a hollow cylinder having a closed end and an open end,
   an integral external annular flange at said open end,
   said first perforate metal reinforcing member being embedded in said filter element in proximity to said external flange, and
   said second perforate metal reinforcing member being embedded in said filter element in proximity to said closed end.

* * * * *

UNITED STATES PATENT AND TRADEMARK OFFICE
CERTIFICATE OF CORRECTION

PATENT NO. : 5,223,138
DATED : June 29, 1993
INVENTOR(S) : James F. Zievers and Elizabeth C. Zievers It is certified that error appears in the above-identified patent and that said Letters Patent is hereby corrected as shown below:

In column 4, line 32 after "relationship" delete "with" and after "disposed" insert --within--

Signed and Sealed this

Third Day of May, 1994

Attest:

BRUCE LEHMAN

*Attesting Officer*          *Commissioner of Patents and Trademarks*